United States Patent [19]

Bailey

[11] Patent Number: 4,774,897
[45] Date of Patent: Oct. 4, 1988

[54] MARKING UNSOWN SEED DRILL ROWS

[75] Inventor: Alfred J. Bailey, Berkswell, United Kingdom

[73] Assignee: Massey-Ferguson Services N.V., Curacao, Netherlands Antilles

[21] Appl. No.: 928,224

[22] PCT Filed: Feb. 12, 1986

[86] PCT No.: PCT/GB86/00076
§ 371 Date: Oct. 3, 1986
§ 102(e) Date: Oct. 3, 1986

[87] PCT Pub. No.: WO86/04772
PCT Pub. Date: Aug. 28, 1986

[30] Foreign Application Priority Data

Feb. 12, 1986 [GB] United Kingdom ............... 8503708

[51] Int. Cl.⁴ .................... A01C 7/00; A01C 7/18
[52] U.S. Cl. .................................................. 111/1
[58] Field of Search .................. 111/1; 172/134, 676, 172/833, 459

[56] References Cited

U.S. PATENT DOCUMENTS 4,237,985 12/1980 Hoefkes ............................... 172/676

FOREIGN PATENT DOCUMENTS 305291  4/1918 Fed. Rep. of Germany ......... 111/1
2247961 5/1975 France ................................. 111/52
2540700 8/1984 France ................................. 111/85
329635  5/1958 Switzerland ...................... 172/676
2032237 5/1980 United Kingdom ................. 111/1
2050784 1/1981 United Kingdom ................. 111/1

Primary Examiner—James R. Feyrer

[57] ABSTRACT

In a seed drill having tractor wheel track eradicators (13), coulters (1) that sow rows of seeds along the line of the tractor wheel tracks (T), and tramlining means (4,5) that serves to stop the supply of seed to said coulters (1) to form tramlines on selected bouts; said track eradicators (13) are lifted out of work when sowing a bout with tramlines so that the tractor wheel tracks (T) remain and form a mark along the unsown rows. Preferably, said coulters (1) are also lifted out of work with the track eradicators (13) so as to avoid disturbing the tractor wheel tracks unduly.

6 Claims, 3 Drawing Sheets

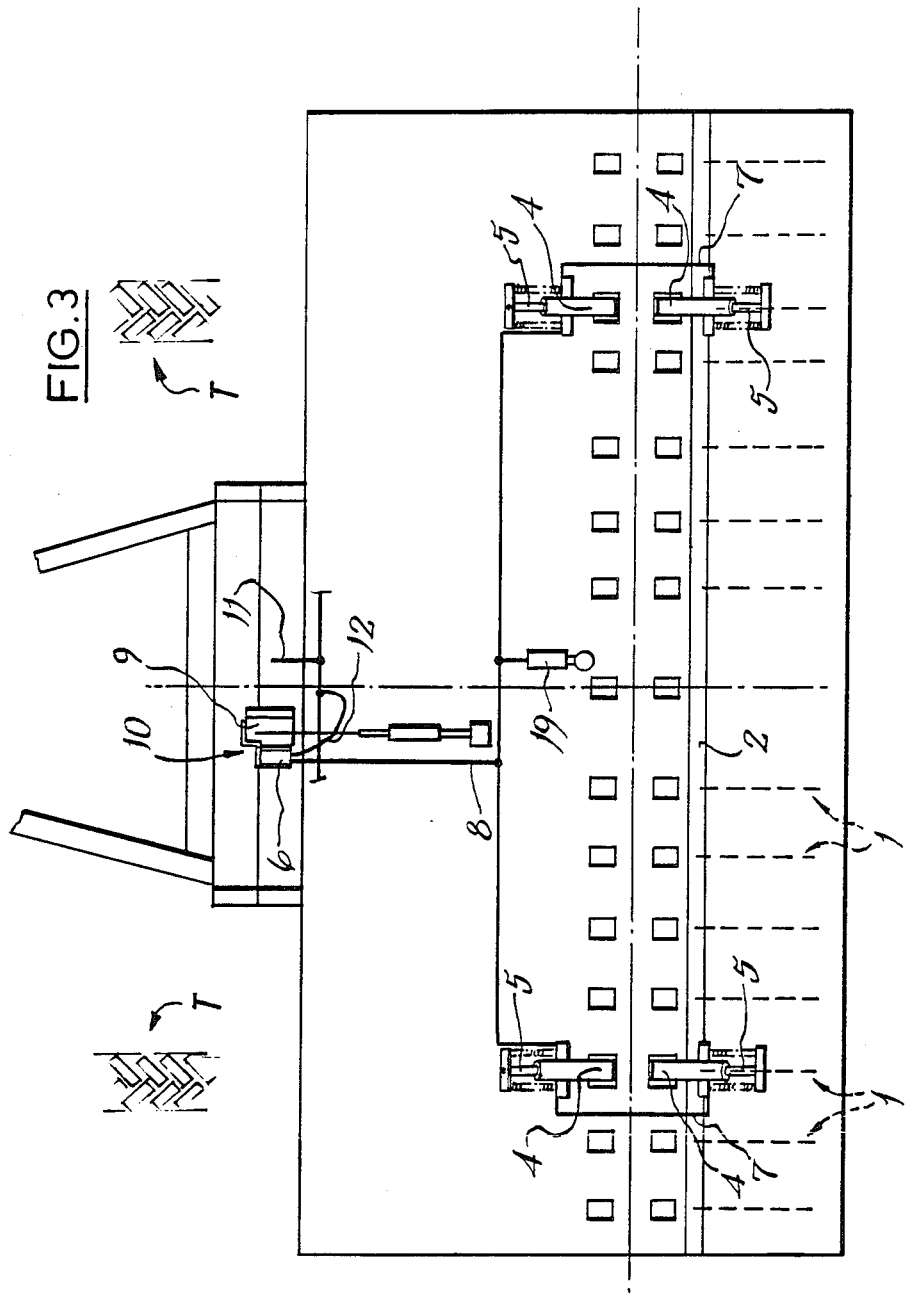

MARKING UNSOWN SEED DRILL ROWS

TECHNICAL FIELD

This invention relates to a seed drill and a method of operating a seed drill to produce marks along unsown rows so that these rows can be used as tracks or tramlines for tractor wheels in subsequent agricultural treatment operations before emergence of the crop makes the unsown rows visible.

It is now common practice to provide seed drills with tramlining means that operates to stop the delivery of seeds to selected coulters during selected bouts so as to produce crop free tracks or tramlines for the passage of the wheels of a vehicle that is subsequently to treat the crop, for example, by spraying or spreading fertilizer or insecticide. Also, it is known to provide seed drills with pre-emegent markers that operate in synchronism with the tramlining means to mark unsown rows so that they are visible and can be used before the crop emerges. Our British Pat. No. 2 050 784 discloses a drill provided with tramlining means and preemergent markers that are hydraulically operated. Necessarily, such markers are located at the rear of the drill behind the coulters and any harrow that might be fitted.

It is also conventional practice with seed drills to provide wheel track eradicators in the form of spring tines or the like that are aligned behind the tractor wheels so as to till the soil ready for sowing. In the case of a trailed drill, the eradicators are movably mounted so that they can be lifted out of work for turning on headlands or for transport of the drill.

DISCLOSURE OF THE INVENTION

An object of the present invention is to provide an improved method and means for use with a seed drill to mark unsown rows, especially a method and means that is suitable for use with a mounted drill and avoids or reduces loading at the rear of the drill.

According to the present invention, in a seed drill having tractor wheel track eradicators, coulters that sow rows of seeds along the line of the tractor wheel tracks, and tramlining means that serves to stop the supply of seed to said coulters to form tramlines on selected bouts; said track eradicators are lifted out of work when sowing a bout with tramlines so that the tractor wheel tracks remain and form a mark along the unsown rows. Preferably, said coulters are also lifted out of work with the track eradicators so as to avoid disturbing the tractor wheel tracks unduly.

It will be appreciated that the invention simply requires means to lift the track eradicators out of work when sowing a bout with tramlines, and that the same means can lift said coulters at the same time. There is therefore, no need to provide separate pre-emergent markers that would load the rear of the drill.

DESCRIPTION OF THE DRAWINGS

The invention will now be describe by way of example with reference to the accompanying drawings in which FIG. 3 is as schematic plan view of part of the drill of FIG. 1, showing the tramlining system.

BEST MODE OF CARRYING OUT THE INVENTION

Figure 1:
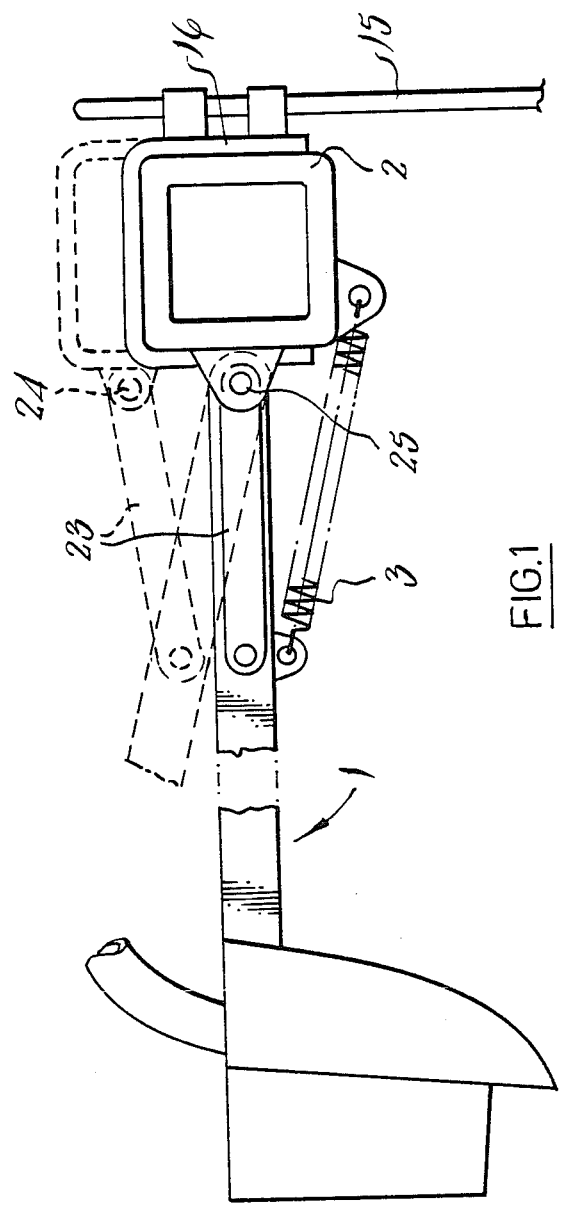
FIG. 1 is a schematic side view of part of a fully mounted drill showing a track eradicator and coulter adapted to be lifted out of work together.
Figure 2:
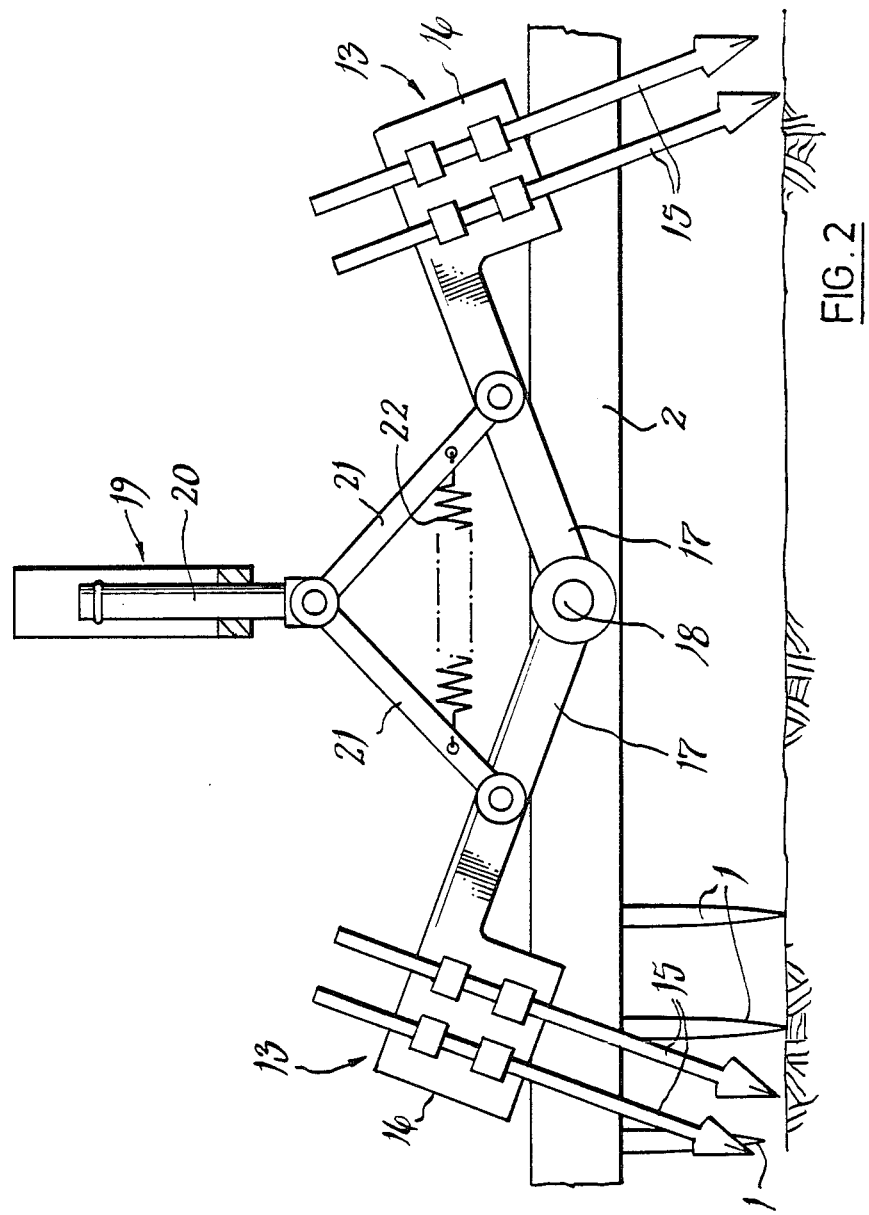
FIG. 2 is a front elevation of the track eradicator and coulter of FIG. 1.

The embodiment of the invention illustrated in FIGS. 1 to 3 is especially applicable to a fully mounted drill fitted with a tramlining system and tractor track eradicators. The coulters 1 are mounted across the width of the drill on a cross-bar 2, each coulter being pivotally connected to the cross-bar so as to trail behind it, and a tension spring 3 being provided beneath the pivot point between the cross-bar 2 and the coulter so as to urge the coulters downwards.

The tramlining mechanism enables the seed and fertilizer spouts associated with selected coulter assemblies to be automatically shut off from the seed and fertilizer hoppers on selected bouts during the sowing of a field.

As can be seen more clearly from FIG. 3, one seed spout and one fertilizer spout on each sde of the centre-line of the drill have their spout shutters 4 controlled by the tramlining mechanism so that they are shut-off when tramlining, thereby leaving two rows of seeds and fertilizer undeposited to form tramlines in the growing crop.

The distance between these tramlines is chosen to correspond to the track width of the tractor drawing the drill and the track width of the tractor to be used in subsequent crop treatment. A single-acting hydraulic cylinder 5 controls each shutter 4, and the pair of cylinders 5 controlling the seed and fertilizer shutters associated with each coulter assembly are connected in series with a control valve 6 via conduits 7 and 8. The control valve 6 is controlled in turn by a cam 9 of a bout counting mechanism 10 so that the valve is open for non-tramlining bouts and passes a supply of pressurised fluid from line 11 via conduit 12 and conduits 7 and 8 to the cylinders 5. Pressurisation of the cylinders 5 opens the shutters 4 and allows seed and fertilizer to be metered to the corresponding coulters. On pre-selected tramlining bouts as registered by the bout counting mechanism 10, the valve 6 is closed and cuts off the supply of pressurised fluid to the cylinders 5 so that the latter remain closed and shut off the supply of seed and fertilizer to the corresponding coulters.

The bout counting mechanism 10 comprises an indexing mechanism that is indexed round a set amount each time the coulters are lifted out of work by the linkage at the rear of the tractor.

Tractor track eradicators 13 are also mounted on the cross bar 2, one behind each wheel of the tractor on which the drill is mounted. Each eradicator 13 comprises a pair of spring steel tines 15 which are rigidly mounted on an inverted channel-section member 16 that is a vertically movable sliding fit over the cross-bar 2. Both carrier members 16 are supported at the outer ends of a pair of pivoted arms 17 that are pivotally connected to the cross-bar 2 about a common pivot axis 18 on the centre-line of the drill, and extend outwards one either side of the centre-line. A hydraulic cylinder 19 controls the position of the arms 17 and is fixedly mounted with the piston rod 20 extending vertically in alignment with the pivot axis 18 of the arms. A pair of pivot links 21 connect the lower end of the piston rod 20 to a midpoint of each arm 17 so that extension of the rod 20 when the cylinder is pressurised thrusts the eradicators 13 downwards into work with the channel-section carrier members 16 engaging over the cross-bar 2. When the cylinder 19 is de-pressurized, a tension spring 22 connected between the links 21 contracts to pull the links together and lift the arms 17 and eradicators 13.

The cylinder 19 is connected to the conduit 8 of the hydraulic system of the drill as shown in FIG. 3 so that it is pressurised and de-pressurised with the tramlining cylinder 5. In normal operation when not tramlining, the cylinder 19 is pressurised and the track eradicators are effective to remove the tracks T of the tractor before the coulters sow seed along these tracks. However, when tramlining, the cylinder 19 is de-pressurised and the track eradicators are held out of work so that the tractor tracks persist, the supply of seed and fertilizer to the associated coulters in alignment with the eradicators then being cut-off.

In order to prevent the coulters that are in alignment with the eradicators from disturbing the tractor tracks when tramlining, these coulters are also connected via pivoted links 23 to the carrier member 16 so that the coulters are lifted out of work with the eradicators. Each link 23 is connected to the carrier member 16 so that the axis of the pivot connection 24 is coaxial with the axis of the pivot connection 25 of the coulter to the cross-bar 2. This ensures that the coulter will pivot in the usual manner when the carrier member 6 engages over the cross-bar to thrust the track eradicators into work.

I claim:

1. A seed drill comprising a frame bearing, in combination, track eradictors, said track eradicators adapted to remove the wheel tracks of a tractor behind which the drill is coupled, at least one row of coulters extending the width of said seed drill and including coulters that are adapted to sow rows of seeds along the line of the tractor wheel tracks and remaining coulters which sow rows of seed outside the tractor wheel tracks, seed supply means adapted to supply seed to said coulters and tramlining means that serves to stop the supply of seed to said coulters to form unsown rows on selected bouts, the improvement comprising first actuator means that serves to operate the tramlining means, second actuator means that serves to operate the track eradicators and said coulters so as to lift them out of work together, control means that serves to control both the first and second actuator means so that the track eradicators and said coulters are lifted out of work simultaneously when the tramlining means stops the supply of seed to said coulters, thereby leaving the tractor wheel tracks undisturbed by the track eradicators and said coulters along the unsown rows while said remaining coulters continue to sow seeds into said rows outside tractor wheel tracks.

2. A seed drill as claimed in claim 1 wherein said frame includes at least one common cross-member, and at least one of said coulters are mounted on said common cross-member.

3. A seed drill as claimed in claim 2 including a carrier, means fixedly mounting said track eradicators on said carrier, means mounting said carrier to be pivoted about an axis, said axis extending in the direction of travel of the drill, and said carrier being supported on said cross-member when in the track eradicating position, and vertically pivoting relative to the axis to lift the track eradicators upon actuation of said second actuation means.

4. A seed drill as claimed in claim 3 in which mechanical linkage means is provided between the carrier and said coulters.

5. A seed drill as claimed in claim 2 in which the control means comprises a hydraulic control system and said first and second actuator means comprises hydraulic actuator means that are connected hydraulically to said hydraulic control system.

6. A seed drill as claim in claim 5 in which the first actuator means comprises a hydraulic actuator that is depressurised to stop the supply of seed to said coulters, and in which said second actuator means is depressurised to lift the track eradicators out of work.

* * * * *